(12) United States Patent
Jansen (10) Patent No.: US 9,844,746 B2
(45) Date of Patent: Dec. 19, 2017

(54) FIBER AND DUST SEPARATING AND COLLECTING SYSTEM FOR TEXTILE PLANTS

(71) Applicant: Industrial Air, Inc., Greensboro, NC (US)

(72) Inventor: Gary D. Jansen, Randleman, NC (US)

(73) Assignee: Industrial Air, Inc., Greensboro, NC (US)

( * ) Notice: Subject to any disclaimer, the term of this patent is extended or adjusted under 35 U.S.C. 154(b) by 38 days.

(21) Appl. No.: 15/049,485

(22) Filed: Feb. 22, 2016

(65) Prior Publication Data
US 2017/0239605 A1 Aug. 24, 2017

(51) Int. Cl.
*B01D 46/00* (2006.01)
*B01D 46/44* (2006.01)
*B01D 46/24* (2006.01)

(52) U.S. Cl.
CPC ......... *B01D 46/446* (2013.01); *B01D 46/008* (2013.01); *B01D 46/0068* (2013.01); *B01D 46/2403* (2013.01); *B01D 2279/40* (2013.01)

(58) Field of Classification Search
CPC .............. B01D 46/00–46/546; B01D 2279/40
USPC ......................................................... 96/408
See application file for complete search history.

(56) References Cited

U.S. PATENT DOCUMENTS

| | | |
|---|---|---|
| 3,097,938 A | 7/1963 | Weller |
| 3,486,309 A | 12/1969 | Wild |
| 4,294,597 A | 10/1981 | Archer et al. |
| 4,298,361 A | 11/1981 | Hocutt et al. |
| 4,655,806 A | 4/1987 | Bowersox |
| 4,737,172 A | 4/1988 | Halder |
| 4,786,293 A | 11/1988 | Labadie |
| 4,878,926 A | 11/1989 | Goodrich |
| 5,217,509 A * | 6/1993 | Jansen ............... B01D 46/0004 55/283 |
| 5,321,942 A | 6/1994 | Hartness |
| 5,505,385 A | 4/1996 | Gengler |
| 5,575,143 A | 11/1996 | Gengler |
| 6,093,237 A | 7/2000 | Keller et al. |

(Continued)

OTHER PUBLICATIONS

Flat Screen Receiver, Industrial Air, Sep. 8, 1992, 2 pgs.
Lo-Vac Receiver, Industrial Air, Feb. 1, 1999, 4 pgs.

*Primary Examiner* — T. Bennett McKenzie
(74) *Attorney, Agent, or Firm* — Womble Bond Dickinson (US) LLP (57) ABSTRACT

A receiver for separating and collecting contaminants, such as lint produced by a textile machine, from an airstream. The receiver includes a housing with an inlet and an outlet. The receiver includes a dumping mechanism to selectively dump the collected contaminants from the bottom of the housing. The housing contains a perforated filter support positioned in a flow path of the airstream from the inlet to the outlet. A tubular mesh screen is attached under tension to the perforated filter support. The tubular mesh screen is positioned in the flow path of the airstream from the inlet to the outlet so that the screen can separate the contaminants from the airstream. An annular bracket ring is attached to a lower portion of the screen to position and facilitate replacement of the screen. Pressure sensors are provided to activate the dumping mechanism based on a predetermined pressure differential.

9 Claims, 12 Drawing Sheets

(56) References Cited

U.S. PATENT DOCUMENTS 7,485,163 B2    2/2009   Yoshimoto
8,349,057 B2    1/2013   Holten et al.

* cited by examiner

FIBER AND DUST SEPARATING AND COLLECTING SYSTEM FOR TEXTILE PLANTS

FIELD OF DISCLOSURE

The present disclosure is directed to industrial air filtration systems of textile plants. More particularly, the present disclosure is directed to a receiver for separating and collecting textile waste, such as dust, lint, fibrous materials and the like, from the contaminated air in these plants.

BACKGROUND

Dust, lint, and fibrous material are common byproducts of textile manufacturing. This waste can often result from several different processes and machines used in the textile industry. Examples include opening, combing, carding, and spinning of raw materials, such as cotton, wool, polyester fibers, and the like. To minimize the presence of these waste products in the air, and provide a more safe working environment for plant workers, large air filtration systems have been developed for use in textile plants. Properly capturing the dust and lint also helps maintain the desired ambient conditions for the ongoing industrial operations. Often, air filtration systems seek to pull or push the dirty air directly from the source of contamination, such as a spinning machine, to continuously and automatically clean the machine. As a result, the waste particles are less likely to enter the ambient environment of the textile plant.

Providing continuous cleaning of textile machinery, which may run for hours if not days without stopping, requires significant filtering capacity and can result in the collection of huge volumes of waste material. Suitable air filtration systems can collect enough waste material to produce nearly thirty 500-lb bales of waste per day in a mill producing two million pounds of product per week. In generally, an airstream is created, for example a high-vacuum airstream with a pressure between about ten and about thirteen inches of mercury (at least 60 inches of water), by a pump system. The airstream is pulled around and through the machinery that generates the waste to pick up (entrain) the contaminants. The airstream is then pulled to a receiver where the contaminants are separated from the airstream and collected. The clean air is then exhausted from the receiver as the clean air is pulled toward the pump system.

Figure 1:
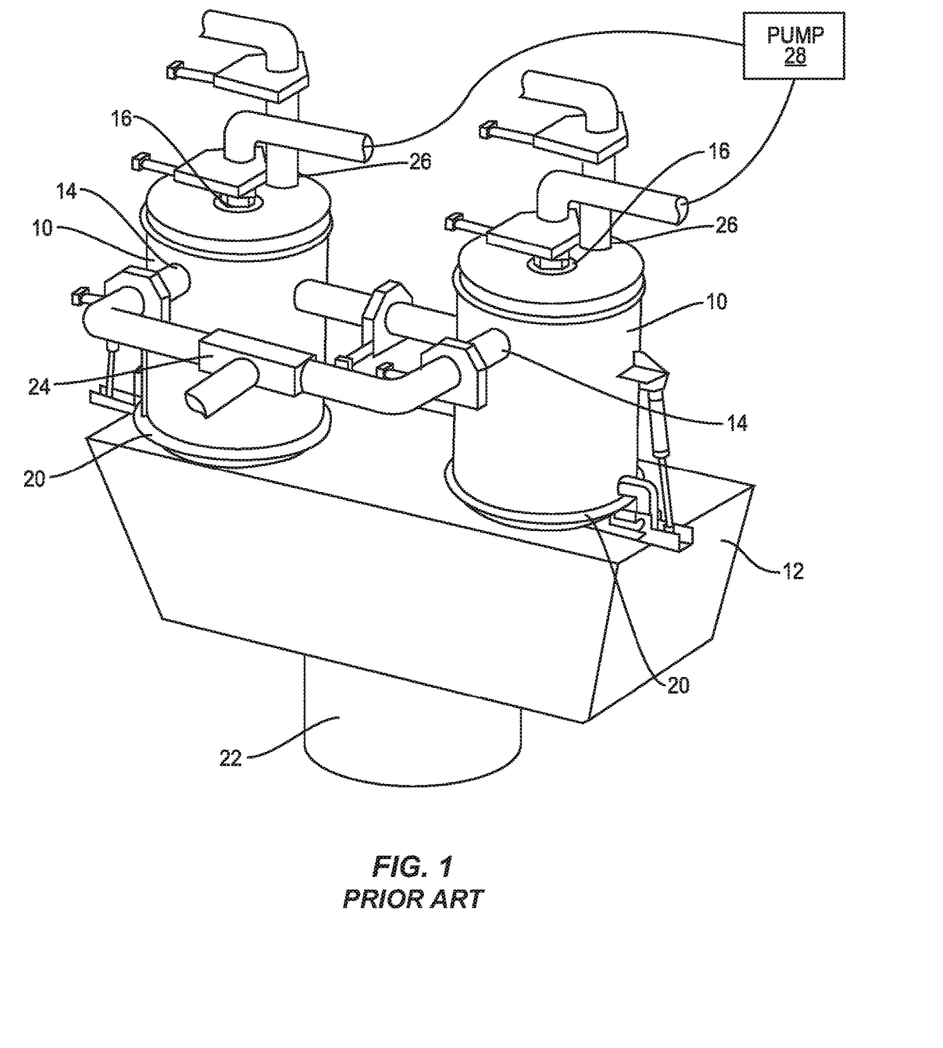
FIG. 1 is a perspective view of filter system having a pair of conventional receivers.
Figure 2:
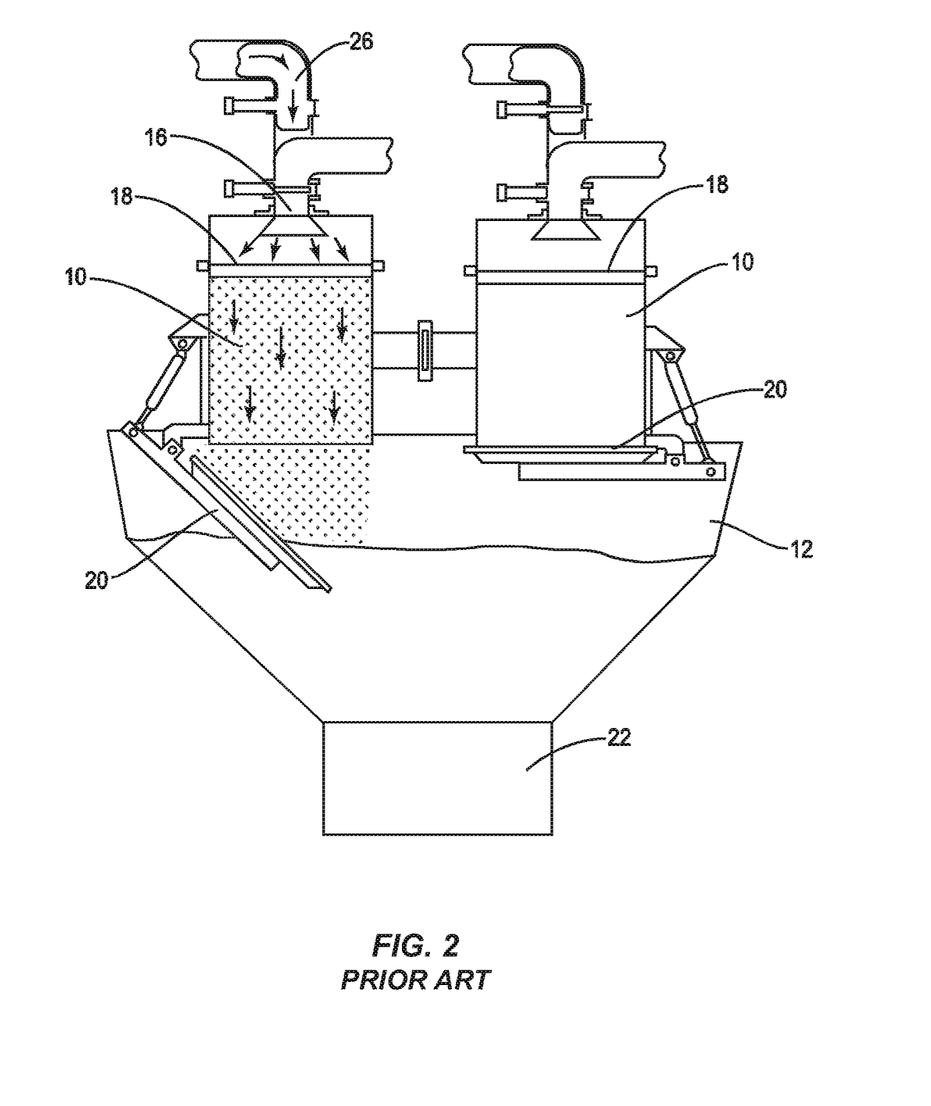
FIG. 2 is a cross section of the filter system of FIG. 1.

One known fiber and lint separating and collecting system is described by U.S. Pat. No. 5,217,509, which shares a common inventor and a common owner with the present disclosure. FIGS. 1 and 2 of the present description help summarize the prior art in the '509 patent. FIG. 1 shows a pair of receivers 10 placed on top of a hopper 12. Each receiver 10 includes a dirty air inlet 14 along the side of the receiver 10 and a clean air outlet 16 out the top of the receiver 10. The contaminants are separated from the airstream by a planar filter 18 as seen in FIG. 2. Periodically, a gate 20 is opened below the receiver 10 to dump the collected waste into the hopper 12. The hopper 12 leads the waste down into a baler 22. Depending upon the content, the bales of waste material may be reclaimed, sold or discarded. While one receiver 10 is dumping waste, e.g. running a dumping cycle, a valve 24 redirects the dirty air to the other receiver 10 such that the dirty air can be continuously received by one of the two receivers 10. During the dumping process, a back-flush of ambient and compressed air is forced through a cleaning inlet 26. The back-flush attempts to separate any contaminants that may be stuck to the planar filter 18. The clean air leaving the clean air outlet 16 is often pulled to a pump system 28 (FIG. 1).

SUMMARY

After several years, the inventor has determined that several changes could be made to affect a variety of improvements in the operation of the receivers and related components used as part of an air filtration system in textile mills. Improvements were made that improved the efficiency of the receivers to reduce energy demand of the air filtration system. Other improvements were made to facilitate the ease of maintenance of the receiver.

In one embodiment, the ability to maintain the receiver has been improved. Particularly, it is well-known that screens will eventually become worn, and require replacement as part of a standard maintenance schedule for the air filtration system. In some existing receivers, significant access into the bottom of the receiver is required to replace a worn out screen. Because receivers are often located above hoppers, which then lead to balers, significant access to the bottom of a receiver can be troublesome. As a result, the inventor has improved the screen to facilitate a replacement method that maximizes replacement steps occurring from the top of the receiver and minimizes the degree of access required from the bottom of the receiver. Particularly, the addition of an annular bracket ring to the filter screen assists with supporting the screen with respect to a filter support.

In another embodiment, the efficiency of the receiver is improved by more accurately controlling the initiation of a dumping cycle. Traditionally, a receiver would begin a dumping cycle when manually initiated by an operator or at periodic time intervals. Often, these time intervals are set conservatively, e.g. shorter than necessary, to avoid over filling the receiver with contaminants and to avoid straining the vacuum system as the pressure drop through the screen increases. To combat this problem, the inventor has provided pressure sensors on each of the upstream and downstream side of the screen. As contaminants fill the receiver and begin to clog the screen, the pressure difference detected by the pair of pressure sensors increases. In certain embodiments, the lid is operatively coupled to the pair of pressure sensors such that the lid is opened, and a dumping cycle initiated, when the pressure difference across the screen reaches a predetermined threshold.

In yet another embodiment, the efficiency of the receiver is improved by more thoroughly cleaning the screen during each dumping cycle. For example, the receiver may use a series of ring-shaped manifolds, spaced apart, and surrounding the cylindrical screen. Each manifold may have an optimized arrangement of discharge nozzles to effectively dislodge contaminants from the screen. Additionally, the use of pilot operated solenoid valves in combination with the ring-shaped manifolds produces sequentially emitted bursts of air from each manifold to more thoroughly clean the screen prior to the next filtering cycle.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 3:
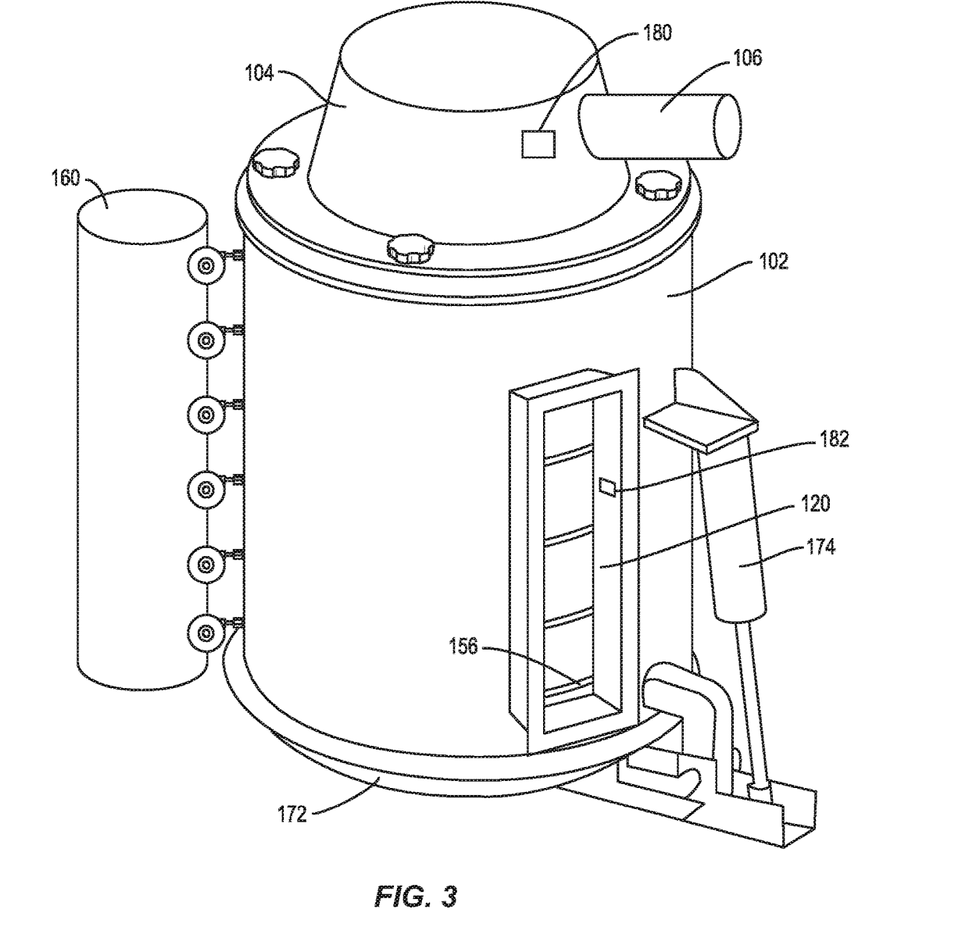
FIG. 3 is a general perspective view of a receiver according to embodiments of the present disclosure.
Figure 4:
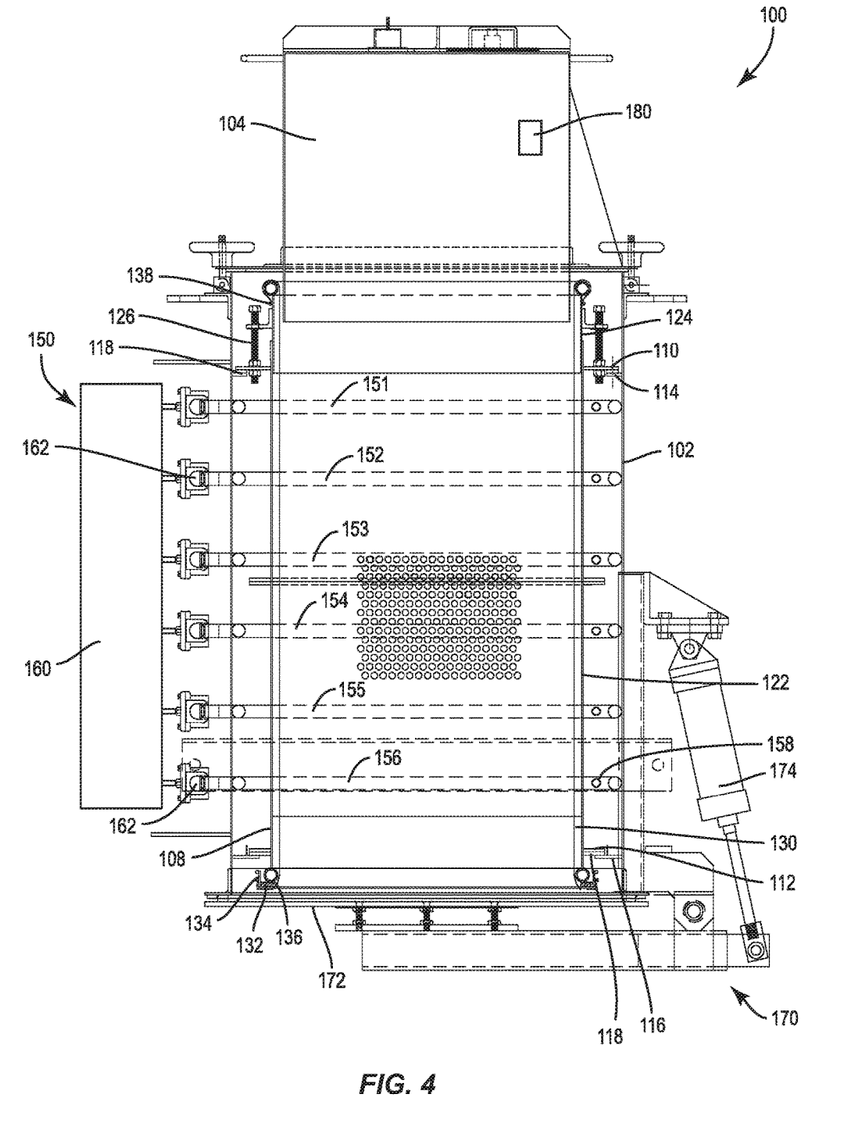
FIG. 4 is a sectional view of a receiver according to embodiments of the present disclosure.

FIGS. 3 and 4 show a perspective view of a receiver 100 and an internal sectional view of a receiver according to embodiments of the present disclosure. The receiver 100 is configured for placement into an air filtration system of a textile mill or similar industrial manufacturing environment, where large volumes of particulate waste, such as dust, lint, fibrous material, and the like, are generated. The air filtration system may include additional receivers as well as a hopper, baler, and high-vacuum pump system as known in the art and seen in FIGS. 1 and 2. The receiver 100 of the present disclosure is configured to separate the contaminates, e.g. the dust and lint, from an airstream of dirty air. The receiver 100 is also configured to temporarily collect the contaminates during a filter cycle. The collected contaminants are then emptied into a baler via a hopper, during a dumping cycle. The receiver 100 may be used in tandem with a second receiver such that one can operate in a filter cycle while the other operates in a dumping cycle.

The receiver 100 includes a housing 102. The housing 102 is generally cylindrical in shape. The housing 102 is generally supported with the cylinder arranged vertically such that a longitudinal axis of the housing 102 defines a vertical axis that defines a height direction of the receiver 100. A top hat 104 (e.g. a cap, or merely a top wall of the housing 102) is removably attached to the upper end of the housing 102 by a plurality of industrial fasteners. The top hat 104 may be completely removable from the housing 102 or may be constructed to swing away from the housing like a door. The top hat 104 includes a dirty air inlet 106 configured to operatively receive an airstream in which contaminants have been entrained. The dirty airstream may result from contaminants found within textile machines having been entrained by a stream of air pulled through the textile machine by suction generated by the vacuum pumping system. The top hat 104 and the dirty air inlet 106 are so arranged as to introduce the dirty airstream to flow substantially down the center of the housing 102.

Figure 5:
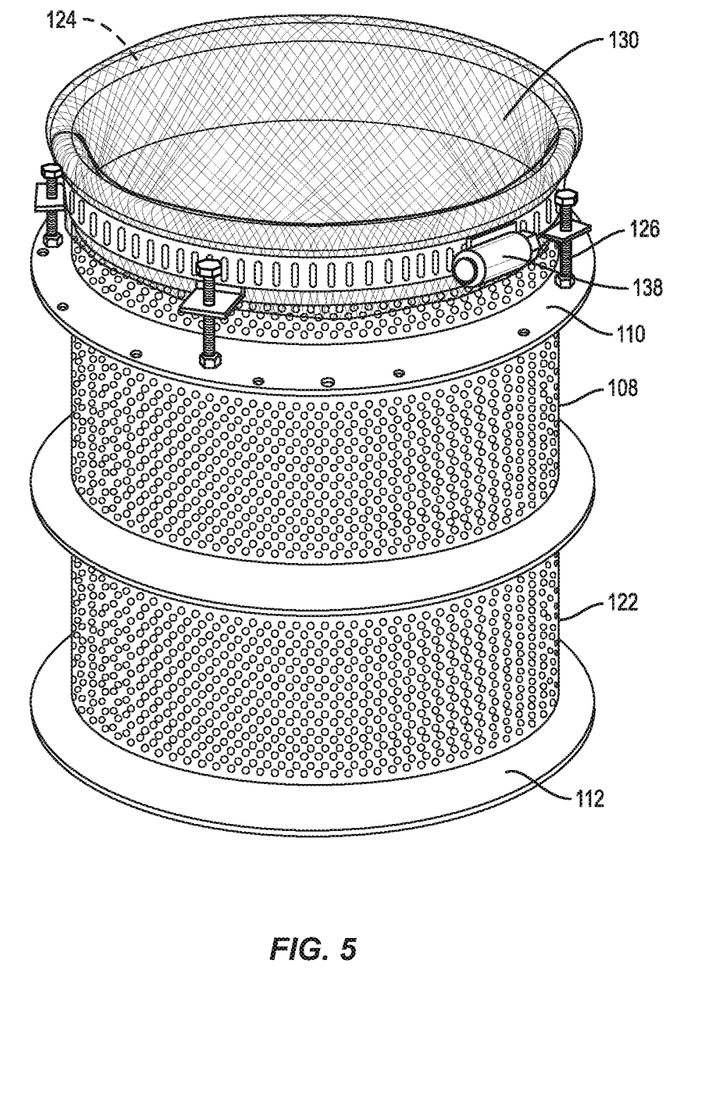
FIG. 5 is a perspective view of the screen mounted to a filter support for use in receivers of the present disclosure.

As seen in FIG. 4, a filter support 108 is disposed within the housing 102. A more detailed view of the filter support 108 is seen in FIG. 5. The filter support 108 may be a cylindrical metal tube with a plurality of closely spaced perforations. The perforations allow the airstream to flow from within the center of the filter support 108 out to the periphery of the filter support. The filter support 108 has an upper circumferential flange 110 extending from the exterior of the filter support near the top of the filter support, and a lower circumferential flange 112 near the bottom of the filter support. The upper circumferential flange 110 is wider than the lower circumferential flange 112. The housing 102 similarly includes a top circumferential flange 114 and a bottom circumferential flange 116 extending inward from an inner surface of a side wall of the housing 102. The top circumferential flange 114 is more narrow than the bottom circumferential flange 116. With this construction, the filter support 108 can be lowered into the housing 102 and be supported on the top and bottom circumferential flanges 114, 116 of the housing. Seals 118 are provided between the upper and top circumferential flanges 110, 114 and between the lower and bottom circumferential flanges 112, 116 respectively. The seals 118 minimize the ability for dirty air to exit a clean air outlet 120 (FIG. 3) without having passed through the periphery of the filter support 108.

The clean air outlet 120 (FIG. 3) is formed along the periphery of the housing 102 (e.g. through a side wall of the housing). The clean air outlet 120 is located at a position between the top circumferential flange 114 and the bottom circumferential flange 116 of the housing 102. Therefore, the dirty airstream will follow a path that enters the housing 102 from above, travels down through the center of the housing, passes radially outward through the filter support 108, and leaves the housing 102 through the air outlet 120 as substantially clean air. In one embodiment, the dirty air inlet 106 has a smaller cross section than the clean air outlet 120. In an example, the size ratio of the dirty air inlet 106 to the clean air outlet 120 is 3:4. The sizes of the dirty air inlet 106 and the clean air outlet 120 effect the flow rate of the airstream and can impact the pressure drop through the system.

In a preferred embodiment, the filter support 108 is configured to have an adjustable height. As possibly best seen in FIG. 5, the filter support 108 may include a first portion 122 and a second portion 124. One or more threaded connectors 126 may operably connect the first portion 122 to the second portion 124. If present, rotation of the threaded connectors 126 causes the second portion 124 to telescope further into or further out of the first portion 122, to adjust the height of the filter support 108 between an extended position and a contracted position. The height adjustment provides a tensioning means as discussed below. In one embodiment, the first portion 122 may be perforated and comprise a majority of the height of the filter support 108. The second portion 124 may or may not be perforated, and may fit inside only a small region at the top end of the first portion 122.

The contaminants within the dirty airstream are separated from the air by a screen 130, also referred to herein as a filter 130. The screen 130 may be formed from a mesh fabric. The inventor has determined that heavy duty nylon may be preferred. An example of heavy duty nylon uses threads with a diameter of about 200 microns. Compared to traditional nylon, the heavy duty fabric provides a longer life-span for the screen 130 and helps to reduce maintenance. For example, a screen 130 made from heavy duty nylon may be able to run for approximately one-year without being replaced. For use in a textile mill, the inventor has determined that a 52 mesh may be preferred in terms of filter performance. For example, compared to a 100 mesh, the 52 mesh has pores that are sufficiently small to catch the desired contaminates, but the larger pores allow for a smaller pressure drop, reducing the energy required to create the airstream. The larger pores of the 52 mesh may also be more easily and thoroughly opened during a back-flush cleaning cycle.

In one embodiment, the screen 130 has a generally cylindrical or tubular shape to sit adjacent to the inner surface of the filter support 108. By using a tubular screen 130 instead of the planar filter of the prior art, without increasing the size of the housing 102, the useful filtering area of the screen 130 is increased significantly. In one example, the area of the tubular screen 130 of the present disclosure was found to be approximately four-and-half times the effective area of the planar filter 18. By increasing the area through which the airstream is filtered, the pressure drop across the screen 130 is significantly reduced. For example, the pressure drop could be reduced from 14 inches of water for the planar filter to 1.4 inches of water for the tubular screen 130, when clean. Thus the pressure drop of the disclosed filter is approximately $1/10^{th}$ of the previous filter. This reduction results in a lower demand for suction on the vacuum pumping system, reducing the cost of operating the air filtration system.

To removably attach the screen 130 to the filter support 108, the lower end of the screen 130 is fit with an annular bracket ring 132 as seen in FIG. 4. The screen 130 may be permanently attached to the annular bracket ring 132, or may be removably attached to the annular bracket ring with a fastener, such as a worm gear clamp. A removable attachment may be preferred so that the screen 130 can be replaced while the annular bracket ring 132 may be re-used. The annular bracket ring 132 includes an axial flange 134 and a radial flange 136. The annular bracket ring 132 has a radius such that the axial flange 134 is configured to fit around the bottom end of the filter support 108. The radial flange 136 is configured to provide an abutment surface with the bottom end of the filter support 108.

The top portion of the screen 130 is wrapped over the top end of the filter support 108 and secured along the outer surface of the filter support by a worm gear clamp 138 or other suitable fastener as shown in FIG. 5. In order to hold the radial flange 136 against the bottom of the filter support 108, some tension along the height direction may be applied to the screen 130 by adjusting the height of the filter support as discussed above between a contraced position and an extended position. The screen 130 is now positioned within the filter support 108 to separate contaminants brought into the center of the tubular screen 130 from the clean air, which exits through the periphery of the tubular screen 130 and then through the filter support 108.

The receiver 100 also includes a cleaning system 150 configured to provide a back-flush of air from outside the periphery of the screen 130 toward the center thereof. In other words, the back-flush occurs along a direction opposite to the travel the filtered airstream. The cleaning system 150 is provided to clean the screen 130 during a dumping cycle of the receiver 100. Cleaning the screen 130 generally involves attempts to dislodge any contaminates that may have built up on the screen 130 during a filtering cycle. The contaminates dislodged from the screen 130 should then be allowed to exit from the bottom of the receiver 100.

The cleaning system 150 of the receiver 100 includes a plurality of manifolds 151-156. In the illustrated embodiment, six manifolds 151-156 are shown, but more or fewer manifolds may be provided in a spaced apart manner along the height of the screen 130. The uppermost manifold may be a first manifold 151. The lowermost manifold may be a last manifold 156. In the illustrated embodiment, each manifold 151-156 is a ring shaped tube disposed within the housing 102 and around the periphery of the filter support 108. The radially inner portion of each manifold 151-156 is provided with a plurality of spaced part discharge nozzles 158 for creating a back-flush of air. The number and size of the discharge nozzles 158, which may be as simple as apertures drilled into the manifold 151-156, is selected to seek thorough cleaning of the screen 130. In one example, the discharge nozzles 158 are circular, with a diameter of about 3/32 inch, and are provided about every 1 to 3 inches, preferably about every 1 and 13/16 inches around each manifold 151-156. This arrangement of discharge nozzles 158 was found to provide a more thorough cleaning when compared to the use of similar nozzles that were spaced only about every 7 inches. The discharge from the manifolds 151-156 is provided as a quick burst to dislodge contaminants from the screen 130. Therefore the quantity, spacing, and size of each discharge nozzle 158 works together to provide a sufficiently strong jet of air, at a sufficient number of locations around the screen 130, to dislodge contaminants.

To facilitate the discharge of a burst (e.g. jet) of cleaning air from each manifold 151-156, a compressed air source 160 is charged to a predetermined pressure, such as between about 60 PSI and about 100 PSI. The compressed air is then released into one of the manifolds 151-156 by opening a pilot operated solenoid valve 162. The inventor has determined that a pilot operated solenoid valve 162 allows for a quicker, stronger burst of air than a similar directly activated valve.

Generally, the manifolds 151-156 are activated sequentially from top to bottom during a cleaning cycle. Thus, the first manifold 151 provides a burst of back-flush air from the compressed air source 160. The compressed air source 160 is charged again. The next manifold 152 provides a burst of cleaning air as a respective pilot operated solenoid valve 162 opens. This process continues until the last manifold 156 has provided a burst of back-flush cleaning air. In one embodiment, this process takes a few minutes or less with only a few seconds or less between each burst of cleaning air.

The cycle of cleaning the screen 130 may be important to the efficient operation of the receiver 100. The closer the screen 130 is to being completely free of contaminants when a filtering cycle starts, the lower the pressure drop across the screen will be initially. Again, the less the pressure drop across the screen 130, the less work the vacuum pump must do to pull a dirty airstream through the receiver 100. This reduces the energy cost of running the air filtration system by increasing suction efficiency and reducing horsepower requirements for the pump. Similarly, the more thoroughly the screen 130 is cleaned with each cleaning cycle, the longer the receiver 100 may be able to run without being cleaned again.

The cleaning cycle used to clean the screen 130 goes hand-in-hand with the dumping cycle used to empty the receiver 100 of the contaminants collected during a filtering cycle. In other words, while the collected contaminates are being dumped during a dumping cycle, the cleaning cycle may be occurring. Therefore, any dislodged contaminants are also dumped from the receiver 100. Traditionally, a receiver would begin a dumping cycle when manually initiated by an operator, or at periodic time intervals. Often, these pre-determined time intervals are set conservatively, i.e. shorter than necessary, to avoid over filling the receiver with contaminants and to avoid straining the vacuum system. Running extra dumping cycles can expedite the mechanical wear on the dumping mechanism 170, such as a lid 172, an air cylinder 174, and the relatively moving parts therebetween. To address this problem, the receiver 100 of the present disclosure is provided with a pair of pressure sensors 180, 182 shown in FIG. 3. The pair of pressure sensors 180, 182 are positioned on opposite upstream and downstream sides of the screen 130. For example, a first pressure sensor 180 may be provided on the top hat 104 to monitor the airstream entering the receiver 100. A second pressure sensor 182 may be provided on the air outlet 120 to monitor the cleaned airstream leaving the receiver 100. As contaminants fill the receiver 100 and begin to clog the screen 130, the pressure difference detected by the pair of pressure sensors 180, 182 increases. A controller (not shown) is operably linked between the pair of pressure sensors 180, 182 and the dumping mechanism 170. When the pressure difference sensed by the pair of pressure sensors 180, 182 reaches a set pressure drop, the controller initiates the dumping cycle and open the lid 172. The lid 172 may also be referred to as the bottom wall of the housing 102. The pressure difference may be set based upon the bulk density of the waste material collected.

By automating the process for initiating a dumping cycle based on a pressure differential, the inventor believes that the receiver 100 will operate more efficiently and reduce wear on the dumping mechanism 170 by eliminating excess dumping cycles. Use of the pressure sensors 180, 182 also allows operation of the receiver 100 to adapt to working conditions. For example, the rate at which the receiver 100 fills with contaminants is often inconsistent, and therefore periodic dumping may not provide an optimized use of resources. The rate at which the contaminants fills the receiver 100 may vary during a filtering cycle as the pressure drop across the screen 130 increases, potentially reducing the efficiency at which the airstream is able to collect the contaminants from the source. In other cases, the source of contaminants, e.g. textile spinning machines, may be running at different rates during different shifts or while producing different products, thus producing waste at varied rates. Using a sensor-based receiver allows the receiver 100 to continue operating efficiently without networking the controls of the textile machines with the controls of the receiver.

The receiver 100 of the present disclosure also provides for maintenance improvements. Even with the use of a heavy-duty nylon, the screen 130 is expected to eventually wear out and require replacement during the ordinary course of operating the receiver 100. In the case of receiver 100, the process for replacing the screen 130 has been improved, at least in part due to the addition of the annular bracket ring 132. Unlike some existing receivers, which require significant access into the bottom of the receiver to replace the screen, the annular bracket ring 132 helps to facilitate a method of replacement primarily conducted above the receiver 100. Because receivers are often located above hoppers, which then lead to balers, significant access to the bottom of a receiver can be troublesome, if not dangerous. A method that minimizes tasks performed under the receiver 100 may have significant benefit.

Figure 6A:
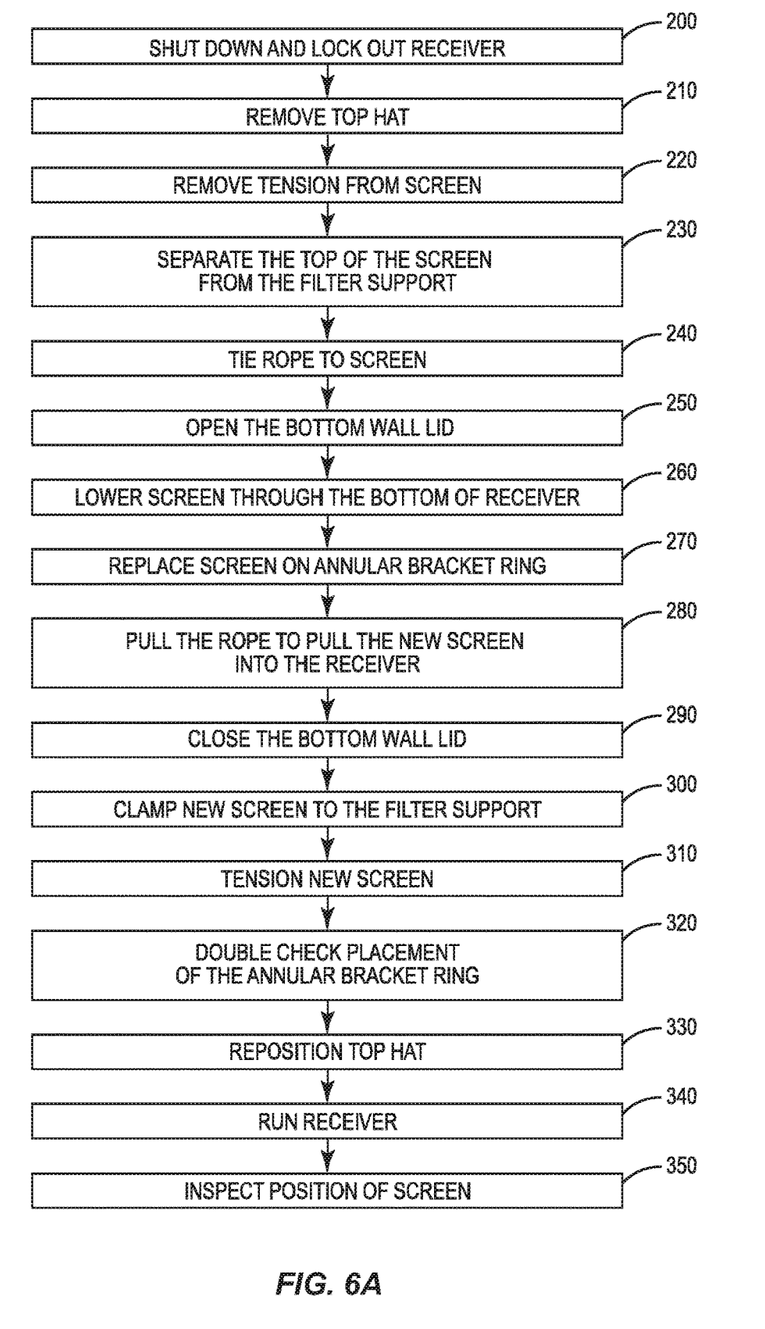
FIGS. 6A-6G schematically illustrate a process for replacing a screen according to an embodiment of the present disclosure.

An exemplary process for replacing the screen 130 will now be described in view of schematic FIGS. 6A-6G. FIG. 6A includes a process flow chart, and FIGS. 6B-6G show a series of schematic illustrations. First, at step 200, the waste system, including the receiver 100 and the baler 22, should be completely shut down and locked out, both electronically and mechanically if possible. If two or more receivers 100 use a common hopper 12 and/or baler 22, each receiver should be separately shut down. The lockout steps may also include locking out the operation of the dumping mechanism 170 individually. In some receivers 100 this includes flipping a vented ball valve operably associated with the lid 172 and the air cylinder 174.

Figure 6B:
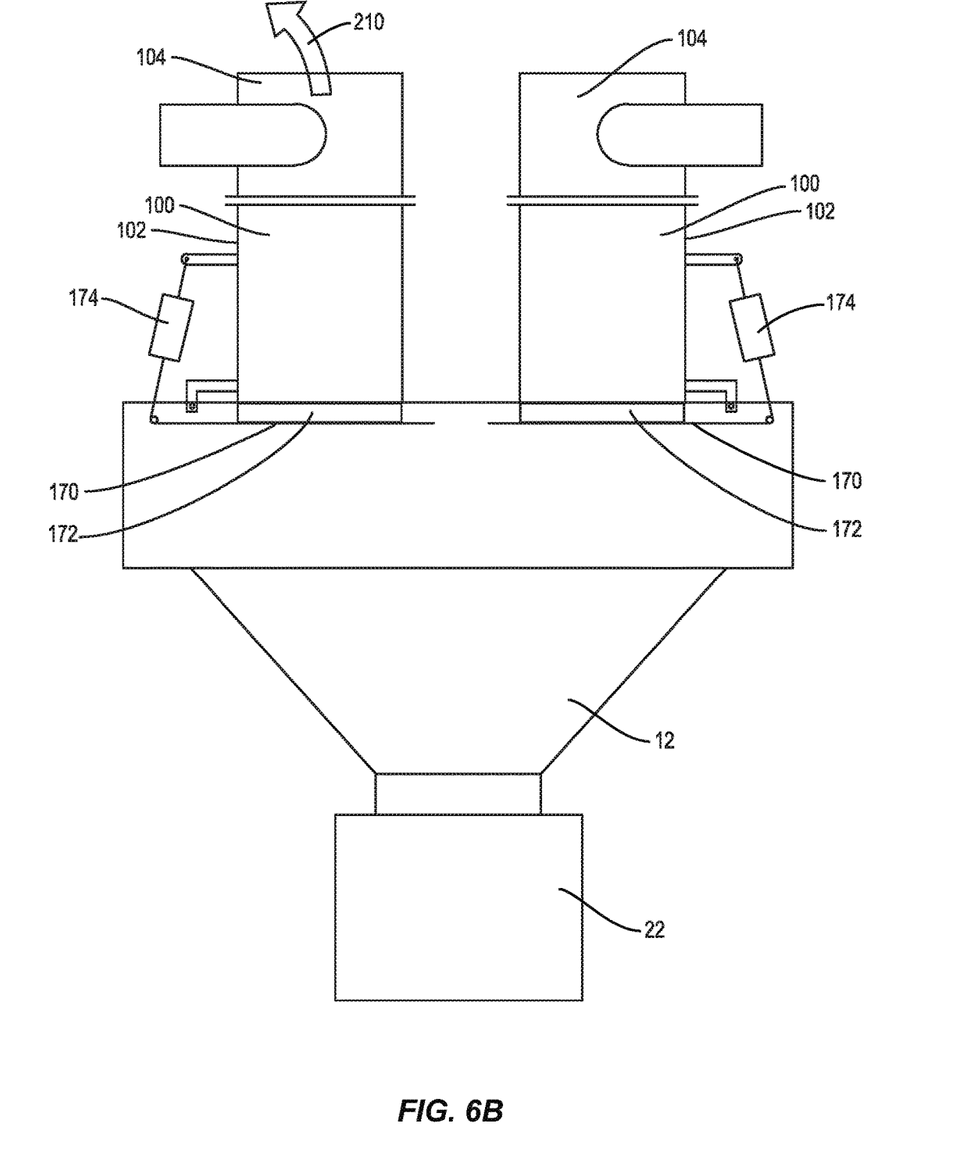

Next, at step 210, the interior of the receiver 100 is accessed by at least partially removing the top hat 104 from the housing 102, see the arrow 210 in FIG. 6B. The top hat 104 may be completely removed from the housing 102 or be configured to be hinged or otherwise reattached during this step.

At step 220 (see FIG. 6C), the tension on the screen 130 is reduced by decreasing the height of the filter support 108 by adjusting the second portion 124 into the first portion 122 using threaded connectors 126. The process of loosening the tension may include use of a cross loosening pattern where a slight adjustment is made at one threaded connector 126 followed by a slight adjustment on a diametrically opposite threaded connector, or by slowing making adjustments while working around the circumference of the filter support 108.

Figure 6C:
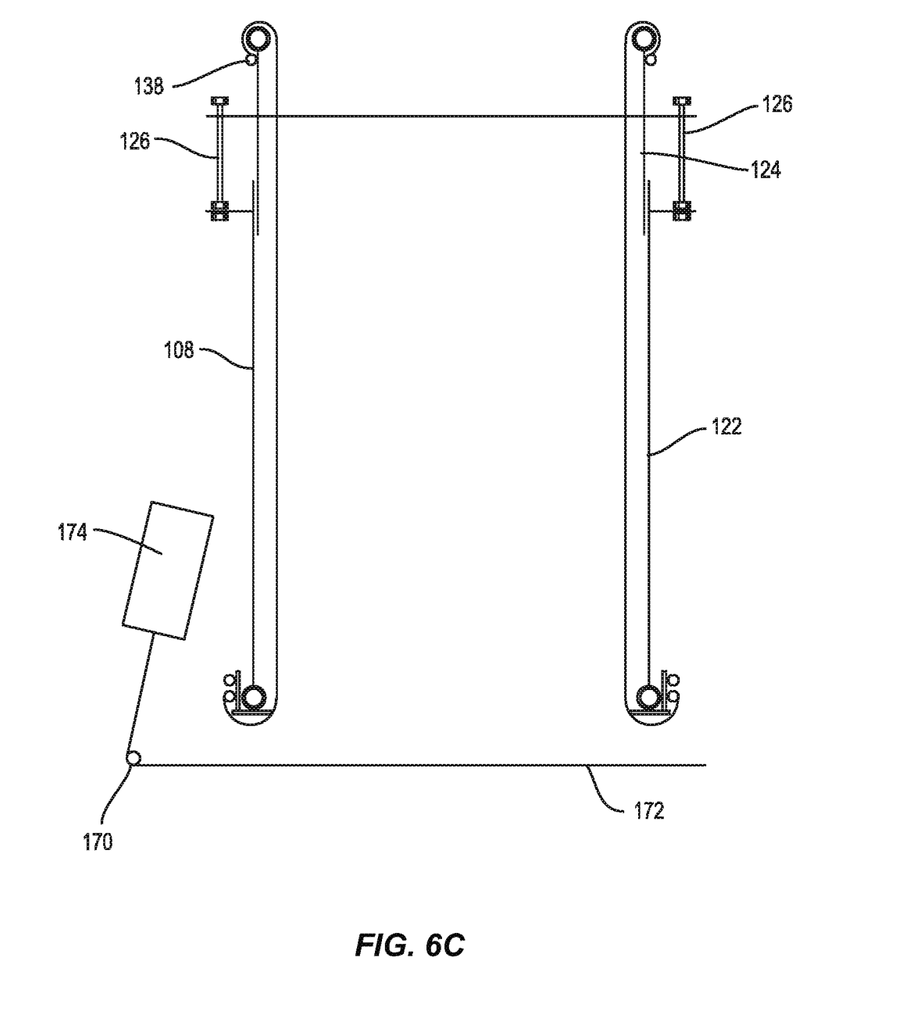

At step 230, the top worm gear clamp 138 is loosened and/or removed to allow the top of the screen 130 to be pulled back over the top of the filter support 108, specifically the second portion 124.

Figure 6D:
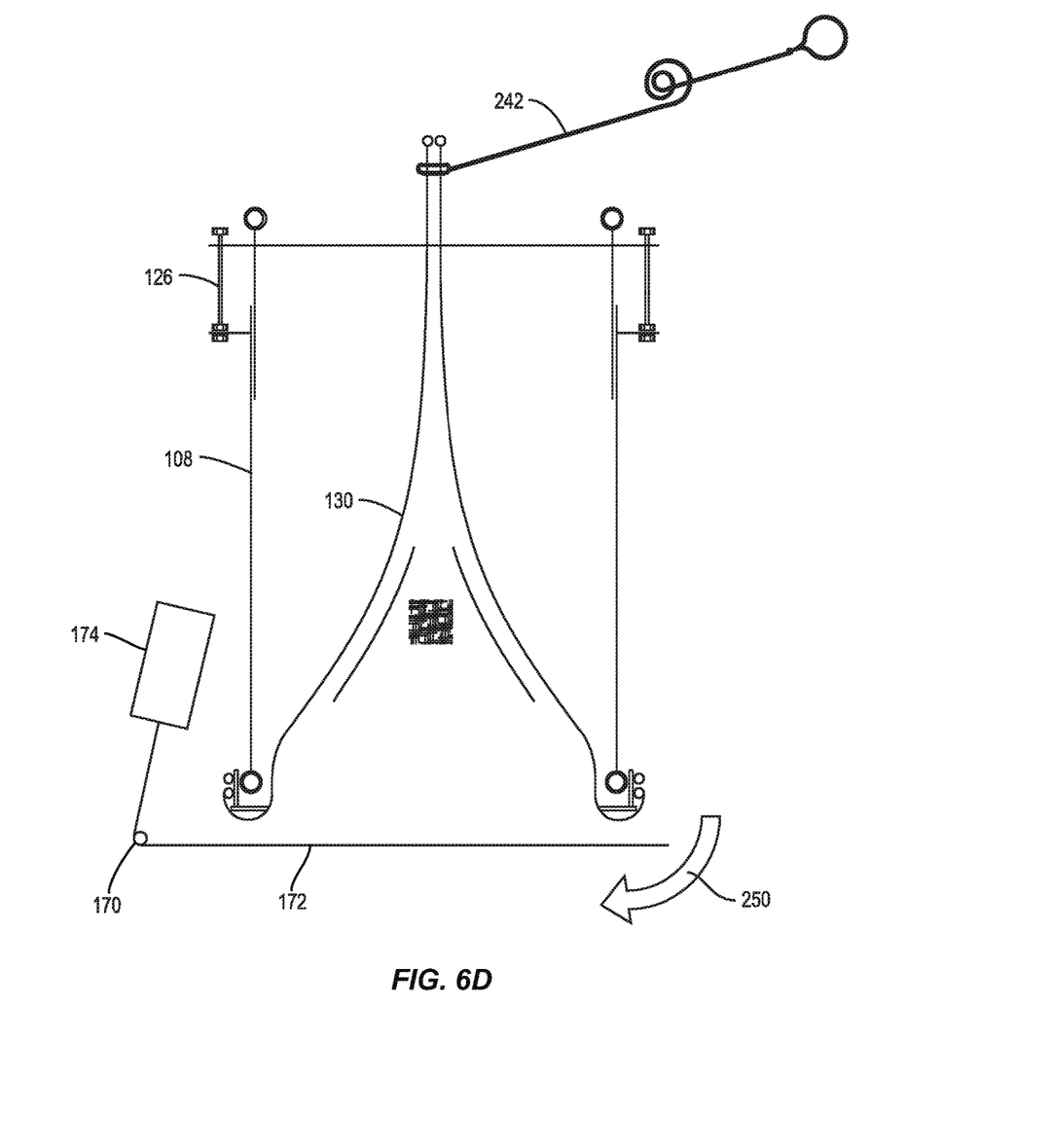

Next, in step 240, a rope 242 or similar lead of significant length may be tied to or around the top of the screen 130. This is illustrated in FIG. 6D.

While holding the rope 242, the technician or their partner manually opens the lid 172 at the bottom of the housing 102. This is step 250, see the arrow labeled 250. In one embodiment, manually opening the lid 172 comprising flipping a ball valve on the dumping mechanism 170 to a position corresponding with holding the lid open.

Figure 6E:
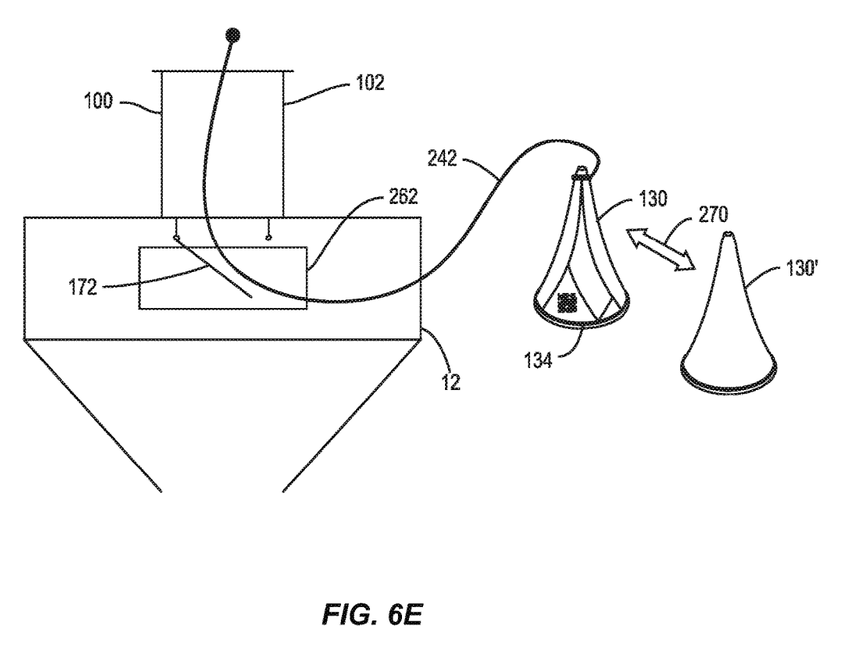

As seen in FIG. 6E, the screen 130, including the annular bracket ring 132 is then lowered through the bottom of the receiver 100 and retrieved from the hopper 12 at step 260. In many cases, conventional hoppers include access doors 262 near the top thereof. A technician may then reach in the access door 262 and pull out the screen 130. Importantly, one end of the rope 242 may be following the screen 130 out of the access door 262 while the other end of the rope is held, secured or otherwise continues to remain easily accessible from the top of the housing 102.

At step 270 (see arrow 270 in FIG. 6E), the worn screen 130 may be removed from the annular bracket ring 132 and the rope 242. A new screen 130' may be secured to the annular bracket ring 132, such as with a worm gear clamp. In other embodiments a new annular bracket ring is secured or was previously provided with the new screen 103'. The rope 242 is attached to the new screen 130'.

Figure 6F:
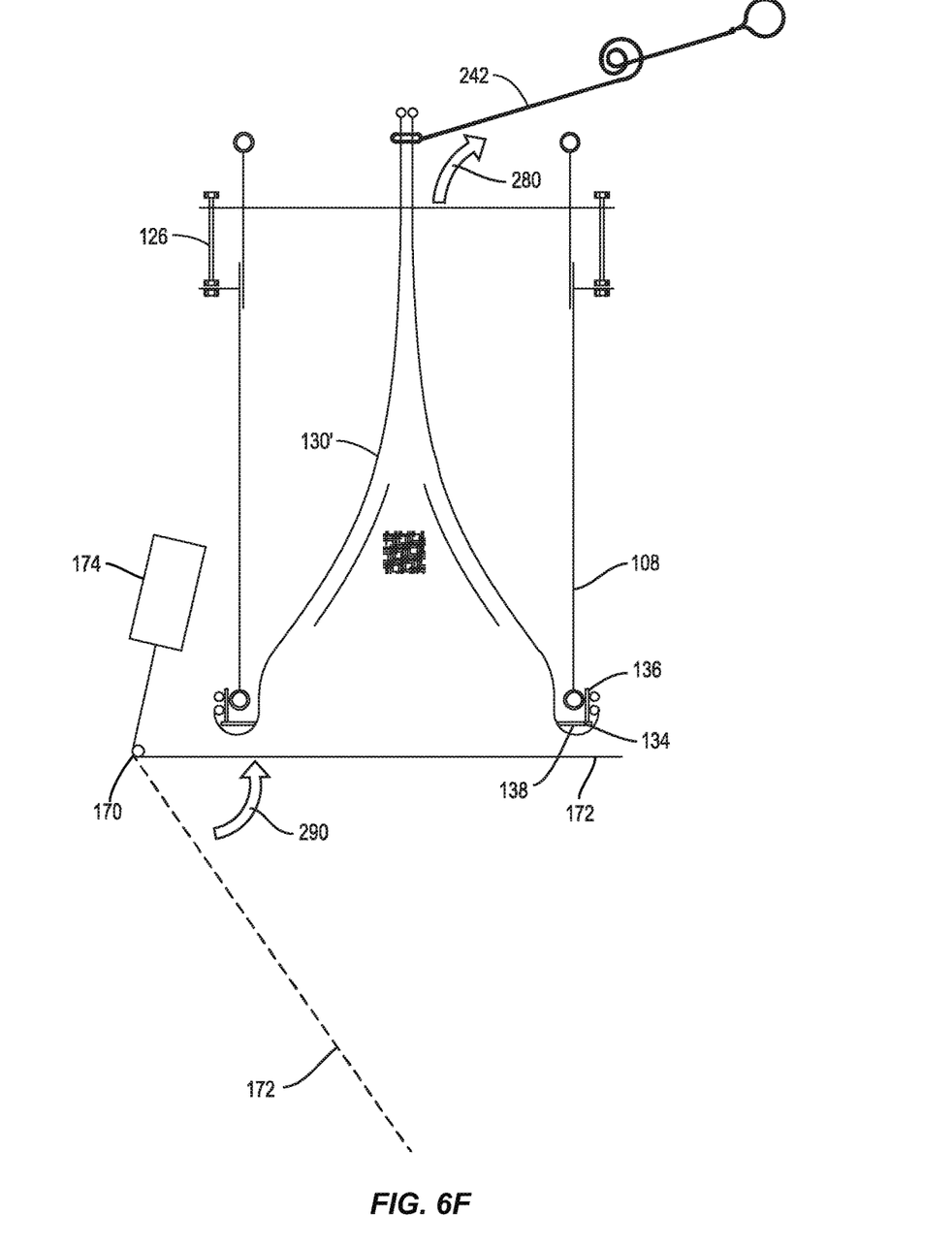

In FIG. 6F, step 280 is illustrated by arrow 280. After preparing the new screen 130', the new screen is pulled through the access door 262 and up into the receiver 100 by pulling on the rope 242 that is extending out of the top of the housing 102. The new screen 130' is pulled up until the annular bracket ring 132 is centered around the bottom of the filter support 108 with the axial flange 134 around the periphery and the radial flange 136 abutting the bottom of the filter support.

To help prevent the new screen 130' from falling down the hopper, the lid 172 may be closed again at step 290 (arrow 290).

Figure 6G:
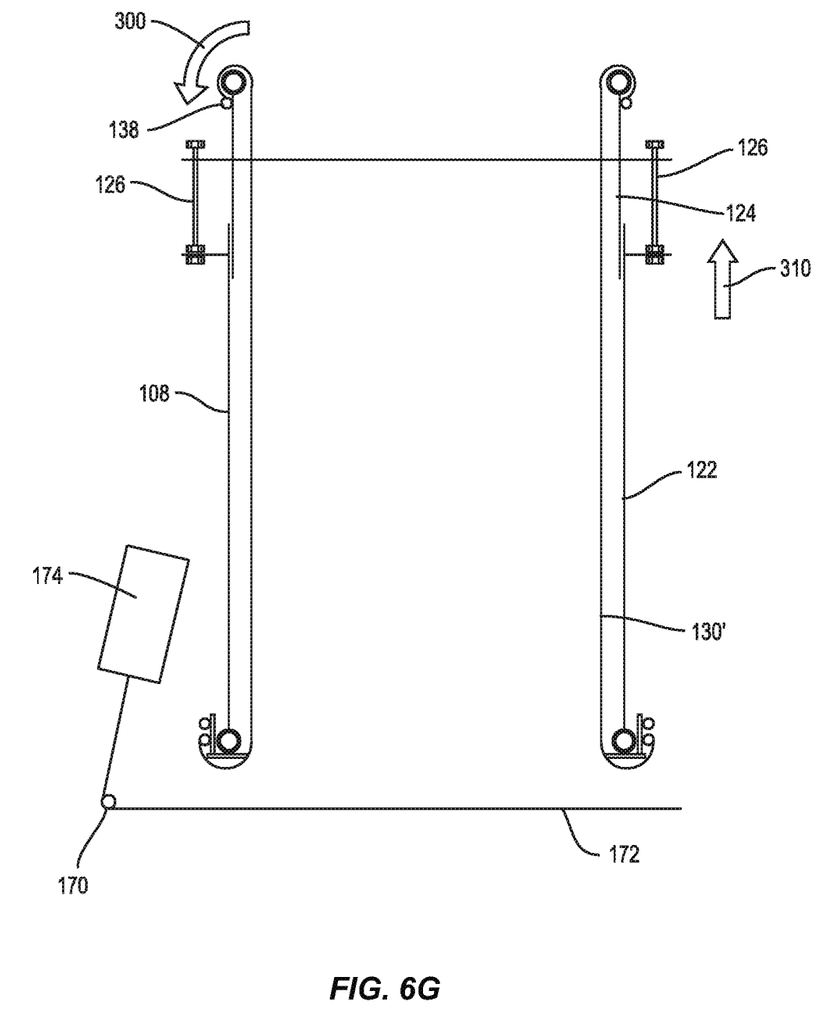

The top of the new screen 130' is then attached and tensioned upon the filter support 108 in the reverse fashion from which the worn screen was removed. Step 300 involves spreading and folding the top of the new screen 130' over the top edge of the filter support and securing the top of the new screen to the filter support with a fastener, such as a worm gear clamp 138. The rope 242 may also be removed from the screen during this step. Step 310 then involves tensioning the new screen 130' across the filter support by increasing the height of the filter support. Holding the screen 130 in tension assists during the cleaning cycle. If the screen 130, 130' were loose on the filter support 108, or second portion 124, the force of the bursts of cleaning air may displace a respective portion of the screen. The energy that displaces the screen 130, 130' is no longer available to dislodge the contaminants from the screen. For this reason, at least some tension is used to hold the screen relative to the filter support.

With the new screen 130' in place, an optional double-check of the position of the annular bracket ring 132 is suggested by once again opening the lid 172 at step 320 (FIG. 6A).

Then at step 330, the top hat 104 is repositioned and secured to the housing 102. The waste system is activated once again at step 340 by reversing any of the shutdown procedures in step 200.

Optional step 350 involves another inspection of the position of the annular bracket ring 132 relative to the filter support 108 by opening the lid 172 after some initial time of normal operation, such as one week. If the new sleeve 130' and the annular bracket ring 132 are not centered and properly tensioned, the new sleeve 130' may be adjusted further.

Again, the process of replacing a screen 130, 130' as described above uses a rope 242 to guide the screen out of and back into the receiver 100. The addition of the annular bracket ring 132 facilitates relative and taut attachment of the bottom of the screen 130 with respect to the bottom of the filter support 108. As such, it is not necessary that a technician reach into the receiver 100 from below in order to secure the screen 130 to the filter support 108.

The process described above is not intended to be the sole manner in which a screen 130 may be replaced within receivers 100 of the present disclosure. Further, the process described above does not necessarily include each and every sub-steps or intermediate step that would be apparent to one of ordinary skill in the art. For example, the step of shutting down the waste system may vary slightly from installation to installation. Similarly, the sub-steps involved in opening or closing the lid 172 of the receiver 100 may vary based on the receiver while remaining within the scope of the present disclosure.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A receiver for separating and collecting contaminants from an airstream, the receiver comprising:
a cylindrical housing having a side wall, a top wall, and a bottom wall, the housing further including an inlet at an upper end for receiving the airstream having contaminants entrained therein, and an outlet in the side wall of the housing for discharging the airstream when substantially free of contaminants;
the bottom wall including a selectively opening dumping mechanism at a bottom end of the housing to dump the collected contaminants;
a cylindrical perforated filter support disposed within and spaced from the side wall of the housing, the filter support positioned in a path of the airstream from the inlet to the outlet, the filter support having a first portion and a second portion configured to telescope with respect to one another such that a length of the filter support is adjustable between a contracted position and an extended position;
a cylindrical mesh screen attached to the perforated filter support such that the mesh screen is positioned in the path from the inlet to the outlet to separate the contaminants from the airstream, wherein the length of the filter support is selected such that, when in the extended position, the screen is supported under tension;
a cleaning system configured to generate at least one jet of back-flush air to clean the screen during a dumping cycle; and
an annular bracket ring attached to a lower portion of the mesh screen, the annular bracket ring abutting a bottom end of the filter support, without being attached thereto, to help position the screen with respect to the filter support.

2. The receiver of claim 1, further comprising:
a first pressure sensor configured to monitor pressure of the airstream upstream of the screen; and
a second pressure sensor configured to monitor pressure of the airstream downstream of the screen,
wherein the dumping mechanism is initiated to open the bottom end of the housing and active the cleaning system when a pressure difference between the pressures of the first pressure sensor and the second pressure sensor reaches a predetermined threshold.

3. The receiver of claim 1, wherein:
the mesh screen is heavy duty nylon with a mesh size of approximately fifty-two.

4. The receiver of claim 1, wherein the cleaning system comprises:
a plurality of annular manifolds spaced apart from one another along a height of the mesh screen, each manifold comprising a discharge nozzle spaced approximately every 1 to 3 inches around an inner radius of the manifold.

5. The receiver of claim 4, wherein the cleaning system further comprises at least one pilot operated solenoid valve configured to produce a respective jet from a source of compressed air through the discharge nozzles.

6. An air filtration system for a textile mill, comprising:
the receiver according to claim 1 disposed above a hopper, which leads to a baler; and
a high-vacuum pump creating at least 60 inches of water of vacuum in operable communication with the receiver such that the high-vacuum pump creates the suction that pulls the airstream through the receiver.

7. A method of replacing a worn filter screen from a receiver of textile waste, the receiver having a housing with a side wall, a top wall, and a bottom wall, the housing also including an inlet at an upper end for receiving an airstream having entrained textile waste, and an outlet in the side wall of the housing for discharging the airstream when substantially free of textile waste, the bottom wall includes a selectively opening dumping mechanism at a bottom end of the housing to dump the collected waste, a cylindrical perforated filter support disposed within and spaced from the side wall of the housing and positioned in a path from the inlet to the outlet, the filter support having a first portion and a second portion configured to telescope with respect to one another such that a length of the filter support is adjustable between a contracted position and an extended position, a worn cylindrical filter screen attached under tension to the perforated filter support with the worn filter screen positioned in the path from the inlet to the outlet to separate the waste from the airstream, and an annular bracket ring attached to a lower portion of the worn filter screen, the annular bracket ring abutting a bottom end of the filter support, the method comprising:

accessing an upper end of the housing;

disconnecting a top portion of the worn screen from the filter support via the upper end of the housing;

attaching a first end of a lead to the top portion of the worn screen via the upper end of the housing;

opening the bottom end of the housing with the dumping mechanism;

removing the worn screen and the annular bracket ring from the receiver through the bottom end of the housing;

removing the first end of the lead from the worn screen;

attaching a replacement screen to the first end of the lead;

attaching a bottom portion of the replacement screen to either the annular bracket ring or a replacement annular bracket ring;

pulling a second end of the lead via the upper end of the housing to pull the replacement screen into the housing via the bottom end until the annular bracket ring abuts the bottom end of the filter support; and     connecting a top portion of the replacement screen to the filter support via the upper end of the housing.

8. The method of claim 7, further comprising adjusting the tension on the screen by adjusting a length of the filter support.

9. The method of claim 8, wherein the bottom portion of neither the worn screen or the replacement screen is fastened directly to the filter support.

\* \* \* \* \*